United States Patent
Cassel et al.

(10) Patent No.: US 10,502,039 B2
(45) Date of Patent: Dec. 10, 2019

(54) WELL MONITORING AND PRESSURE CONTROLLED LANDFILL PUMP

(71) Applicant: Landtec North America, Inc., Colton, CA (US)

(72) Inventors: Mitchal Cassel, Redlands, CA (US); Jamie Tooley, Beaumont, CA (US); Scott Marcell, Banning, CA (US)

(73) Assignee: Landtec North America, Inc., Colton, CA (US)

( * ) Notice: Subject to any disclaimer, the term of this patent is extended or adjusted under 35 U.S.C. 154(b) by 0 days.

(21) Appl. No.: 15/727,176

(22) Filed: Oct. 6, 2017

(65) Prior Publication Data

US 2018/0087536 A1    Mar. 29, 2018

Related U.S. Application Data

(62) Division of application No. 14/629,413, filed on Feb. 23, 2015, now Pat. No. 9,909,598.

(60) Provisional application No. 61/943,919, filed on Feb. 24, 2014.

(51) Int. Cl.
| | | |
|---|---|---|
| *E21B 43/12* | (2006.01) | |
| *F04F 1/06* | (2006.01) | |
| *E21B 47/06* | (2012.01) | |
| *B09B 1/00* | (2006.01) | |
| *B09C 1/00* | (2006.01) | |

(52) U.S. Cl.
CPC ............ *E21B 43/129* (2013.01); *B09C 1/005* (2013.01); *E21B 47/06* (2013.01); *E21B 47/065* (2013.01); *F04F 1/06* (2013.01)

(58) Field of Classification Search
CPC .......... F04B 47/08; F04B 47/00; F04B 47/02; F04B 47/04; F04B 53/145; F04B 39/0027; B09C 1/005; B09B 1/00; B09B 1/006; E21B 43/129; E21B 47/06; E21B 47/065; F04F 1/06; F16K 31/18; F16K 31/24
See application file for complete search history.

(56) References Cited

U.S. PATENT DOCUMENTS

| | | | |
|---|---|---|---|
| 3,288,081 A | 11/1966 | McMillan | |
| 4,826,406 A | 5/1989 | Wells | |
| 4,892,658 A | 1/1990 | Martin et al. | |
| 5,074,758 A * | 12/1991 | McIntyre | ................... F04F 1/06 417/138 |
| 5,147,185 A * | 9/1992 | Niehaus | ................ E21B 43/121 417/394 |
| 5,358,037 A | 10/1994 | Edwards et al. | |
| 5,358,038 A | 10/1994 | Edwards et al. | |
| 5,470,206 A | 11/1995 | Breslin | |
| 5,495,890 A | 3/1996 | Edwards et al. | |
| 5,525,042 A | 6/1996 | Batten | |

(Continued)

FOREIGN PATENT DOCUMENTS

| | | |
|---|---|---|
| CN | 102235028 A | 11/2011 |
| WO | 1998020232 A1 | 5/1998 |

(Continued)

*Primary Examiner* — Nathan C Zollinger
(74) *Attorney, Agent, or Firm* — Harness, Dickey & Pierce, P.L.C.

(57) ABSTRACT

A submersible landfill pump system may include sensors to detect conditions inside the pump and/or well. In some embodiments, the sensors can be placed along an electrical wire within the well and provide sensor data to a user.

19 Claims, 8 Drawing Sheets

(56) References Cited

U.S. PATENT DOCUMENTS

| | | |
|---|---|---|
| 5,549,157 A | 8/1996 | Johnson et al. |
| 5,611,671 A | 3/1997 | Tripp, Jr. |
| 5,611,672 A | 3/1997 | Modesitt |
| 5,662,460 A | 9/1997 | Modesitt |
| 5,672,050 A | 9/1997 | Webber et al. |
| 5,725,026 A | 3/1998 | Maimets |
| 5,938,409 A | 8/1999 | Radle, Jr. et al. |
| 5,941,691 A | 8/1999 | Stephens |
| 5,944,490 A | 8/1999 | Breslin |
| 6,039,546 A | 3/2000 | Edwards et al. |
| 6,045,336 A | 4/2000 | Webb et al. |
| 6,056,876 A | 5/2000 | Yamasaki et al. |
| 6,095,759 A | 8/2000 | Breslin |
| 6,146,104 A | 11/2000 | Mastroianni et al. |
| 6,224,343 B1 | 5/2001 | Newcomer |
| 6,268,911 B1 * | 7/2001 | Tubel ............... E21B 23/03 |
| | | 250/256 |
| 6,283,676 B1 | 9/2001 | Hater et al. |
| 6,352,109 B1 | 3/2002 | Buckman, Sr. |
| 6,478,552 B1 | 11/2002 | Batten et al. |
| 6,582,205 B2 | 6/2003 | Batten et al. |
| 6,676,837 B2 | 1/2004 | Keeton, Jr. |
| 7,208,855 B1 * | 4/2007 | Floyd ............... E21B 43/128 |
| | | 166/66.4 |
| 7,316,544 B2 | 1/2008 | Vidrine |
| 7,946,341 B2 * | 5/2011 | Hartog ............... E21B 43/26 |
| | | 166/254.1 |
| 8,020,616 B2 * | 9/2011 | Greenaway ......... E21B 47/0007 |
| | | 166/250.01 |
| 8,080,616 B2 * | 12/2011 | Pellegatti ............ C08L 23/0815 |
| | | 525/191 |
| 8,551,341 B2 | 10/2013 | Conner et al. |
| 8,679,339 B2 | 3/2014 | Kuang et al. |
| 2003/0159988 A1 | 8/2003 | Daigger et al. |
| 2005/0201831 A1 | 9/2005 | Lee et al. |
| 2012/0179378 A1 * | 7/2012 | Duncan ............... E21B 47/123 |
| | | 702/8 |
| 2014/0110099 A1 | 4/2014 | Colby |
| 2014/0182846 A1 | 7/2014 | Fischer et al. |
| 2015/0118068 A1 | 4/2015 | Strunk et al. |

FOREIGN PATENT DOCUMENTS

| | | | |
|---|---|---|---|
| WO | 2008005437 A2 | 1/2008 | |
| WO | WO-2010009496 A1 * | 1/2010 | ............. F04B 47/00 |

* cited by examiner

WELL MONITORING AND PRESSURE CONTROLLED LANDFILL PUMP

CROSS-REFERENCE TO RELATED APPLICATIONS

This application is a divisional of U.S. patent application Ser. No. 14/629,413, filed on Feb. 23, 2015, which claims the benefit of U.S. Provisional Application No. 61/943,919, filed on Feb. 24, 2014. The disclosures of the above applications are incorporated herein by reference.

BACKGROUND

Most landfill gas is produced by biodegradation, which occurs when organic waste is broken down by bacteria naturally present in the waste and in the soil used to cover the landfill. Landfill gas is mostly made of methane, carbon dioxide, and trace amount of a wide variety of volatile organic compounds.

Landfill gases can contribute to ozone formation, atmospheric photochemical reaction, and other types of air pollution. Landfill gases can also create dangerous conditions. For example, if methane is present in the air at higher concentrations, it can be explosive. Landfill gases may also contribute to water pollution if it migrates and comes in contact with groundwater. Therefore, it is desirable to collect landfill gas to prevent these dangers. Collected landfill gases can be used as a source of power generation, or be incinerated before being released into the atmosphere.

Landfill sites can sometimes be filled with liquid. Excessive levels of liquid can reduce gas extraction efficiency drastically. In order to ensure efficient extraction of landfill gases, such liquid needs to be pumped out of the landfill site.

SUMMARY

The present technology relates to submersible landfill pump systems and, in particular, submersible landfill pump systems having sensors to detect condition inside a well. As noted above, excess liquid can reduce gas extraction capacity of a well. Thus, extraction of liquid may be performed through drilling a well into a location in the landfill, and inserting a submersible landfill pump through the well. The submersible landfill pump may be connected via sheathed tubing that extends from above the surface of the landfill to the landfill pump. The tubing can transport liquid from the pump to the surface of the landfill, and supply air to the interior of the pump. A portion of the submersible landfill pump can have fluid inlet structure. This portion of the pump can become submerged in liquid inside the well, so that the liquid can enter the interior of the pump. The pump then extracts liquid from the inside of the pump through a discharge pipe connected to the tubing, which can include more than one tube. A separate tube may be used to supply or extract air to and from the pump from above the landfill surface.

Wells and pumps used to extract water from the wells can easily become expensive. For example, the landfill may include waste that can be hard to drill through. Also, the landfill site may need to be drilled to a significant depth, in order to achieve a desired depth for liquid extraction. A large number of wells may need to be installed within the landfill site to ensure efficient landfill gas extraction. This, in turn, requires a large number of pumps to be used within the wells. Therefore, submersible landfill pumps should be relatively simple, inexpensive, and should fit in a small diameter well due to the increased cost of drilling large diameter wells. Ideally, such pumps are also suited for long term use, without requiring too much maintenance, adjustment, or replacement.

A landfill gas extraction site can present several issues over time. The rate of bioactivity within the landfill site may gradually decrease. Subsurface shifting of landfill can occur, which may trap liquid in some parts of the landfill gas extraction site. Subsurface shifting of landfill may also affect the level of bioactivity. For example, a landfill site may have little to no bioactivity around 75 feet below surface, but may have bioactivity around 25 feet below surface. Presence of liquid can be detected by detecting the pressure within the submersible pump. Bioactivity of a landfill site can be detected by the temperature within the well. For example, a temperature of around 75° F. can indicate that there's sufficient bioactivity to place a pump. Temperature substantially below 75° F. may indicate that there is little to no bioactivity within the depth range.

Self-actuating pumping systems have been used to extract liquid from a landfill gas extraction site. Such self-actuating pumping systems can use a float actuating mechanism, which actuates a pump valve based on the level of liquid inside the pump. The float actuating mechanism can be preset to discharge liquid at a fixed rate without manual adjustment.

Self-actuating pumps generally provide increased efficiency and cost savings. However, self-actuating pumps may have limited lifespan. For example, subsurface shifting of landfill masses can cause kinks to the well piping and the pump. Repeated impact from opening and closing of the valve can bend or break components of the pump, such as the guiding rod used to open or close the valve. In order to replace an inoperable pump, a technician would have to first detect that a pump is inoperable, and then get approval from an off-site engineer. This can further affect the efficiency and cost of operation.

Existing submersible pumps may also have inaccurate pumping rate. Sometimes the float operated valve may not open or close definitively, which results in leakage or introduction of unwanted air to pump. Float actuation mechanisms require pumps to be larger. Larger size can make pumps expensive, as well as expose pumps to more impact and stress.

Thus, a need exists for a submersible landfill pump system that is accurate and can be used long-term. Also, a need exists for a submersible landfill pump system that allows a technician to detect subsurface conditions from the outside. Accordingly, described herein are various submersible landfill pump improvements and features. Some technical solutions discussed herein are in response to the realization that existing submersible landfill pump systems do not provide a mechanism to reduce impact from repeated opening and closing of the valve. Further technical solutions discussed herein are in response to the realization that existing submersible landfill pumps do not provide the capability for a technician to accurately determine conditions inside the well. Thus, there further exists a need for a submersible landfill pump system which reduces stress to the pump and allows for accurate determination of subsurface conditions in the field.

BRIEF DESCRIPTION OF THE DRAWINGS

The above-mentioned aspects, as well as other figures, aspects, and advantages of the present technology will now be described in connection with various embodiments, with reference to the accompanying drawings. The illustrated embodiments, however, are merely examples and are not intended to be limiting.

FIG. 8a illustrate an example sensor array that includes a plurality of sensors (e.g., temperature, pressure, humidity, etc.) not attached to a pump and configured for positioning in a cavity.

DETAILED DESCRIPTION

Figure 1:
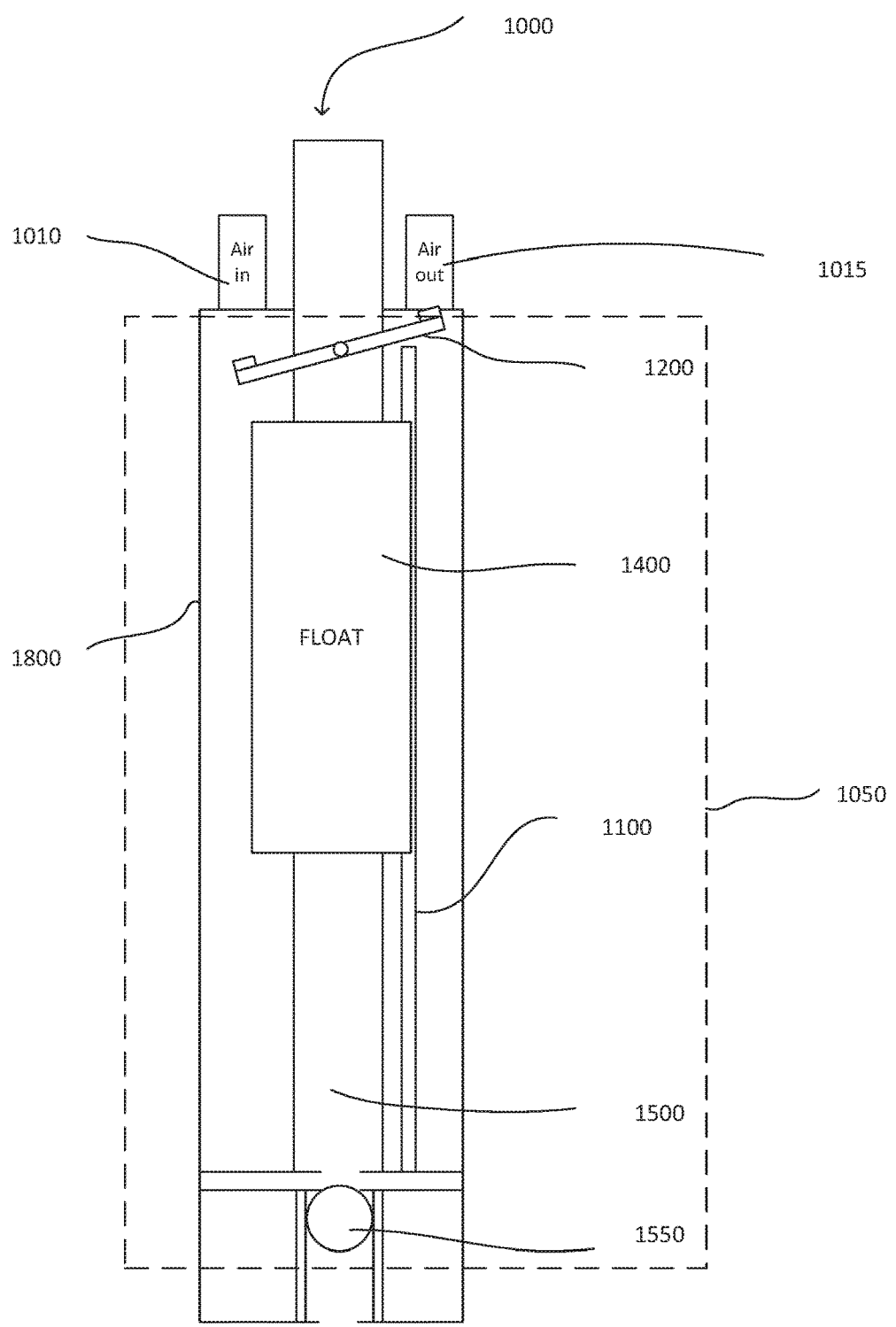
FIG. 1 is a schematic drawing of an exemplary submersible landfill pump.

The systems, methods and devices described herein have innovative aspects, no single one of which is indispensable or solely responsible for their desirable attributes. Without limiting the scope of the claims, some of the advantageous features will now be summarized.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, illustrated in the figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations in further modifications of the features illustrated herein, and additional applications of the principles of the disclosures as illustrated herein, which would occur to one skilled in the relevant art and having possession of this disclosure, are to be considered within the scope of the disclosure.

Descriptions of the necessary parts or elements may be omitted for clarity and conciseness, and like reference numerals refer to like elements throughout. In the drawings, the size and thickness of layers and regions may be exaggerated for clarity and convenience.

Embodiments described herein generally relate to systems, devices, and methods related to submersible landfill pump systems. More specifically, some embodiments relate to submersible landfill pump systems having sensors to detect condition inside a well and/or sensor actuate pumps.

Submersible Landfill Pump

FIG. 1 is a schematic drawing of an exemplary submersible landfill pump. As noted above, an operating goal of submersible landfill pumps is to avoid the necessity of external controllers by incorporating sensing means within the pump to detect when a water level within the pump has reached a certain level. Therefore, in the embodiment of FIG. 1, the submersible landfill pump system 1000 includes a float actuation mechanism 1050 within a pump casing 1800. The float actuation mechanism 1050 can include a float rod 1100, a rocker assembly 1200, a float 1400, a discharge tube 1500, and a check ball 1550. In other embodiments, a float actuation mechanism may include a portion of these components, similar components, and/or additional components.

In some embodiments, groundwater from landfills can enter the pump from outside of the casing. Increase in water level inside the pump can raise the float 1400 to actuate the rocker assembly 1200, thereby letting air from outside of the pump to enter the interior of the pump 1000. For example, in some embodiments a tube is connected to the Air In connection 1010 on the top of pump 1000 and is connected on the opposite and outside of the well to a pressurized air source, such as may be provided by an air compressor or series of air compressors. When the Air In port 1010 become unblocked by the rocker assembly 1200 (in response to the float rod 1100 pushing the rocker arm 1200 on the side opposite a central axis as the water level inside the pump rises and causes the float 1400 to correspondingly rise), pressurized air enters the pump and creates a pressure which forces the check ball 1550 downward to enable water to escape through the discharge tube 1500 up to the landfill surface. The float actuation mechanism 1050 is preset to open at a desired level of pressure inside the pump 1000. For example, the float actuation mechanism 1050 can be configured to actuate the rocker assembly 1200 at about 30 psi. Depending on the embodiment, the float can be configured to a given buoyancy to adjust the level at which the float actuates the rocker assembly 1200.

Submersible Landfill Pump Connections

Figure 2:
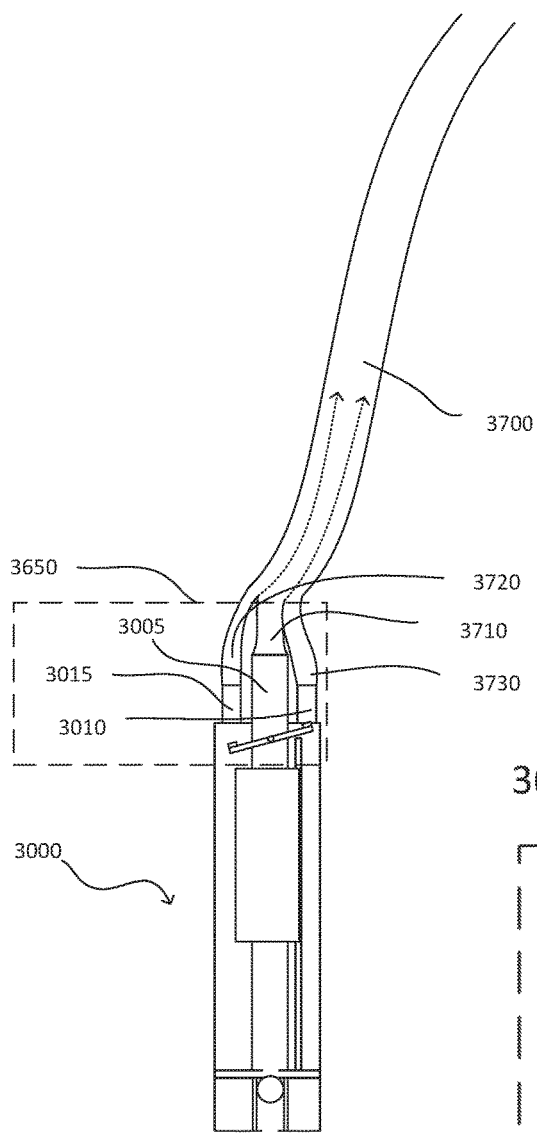
FIG. 2 is a schematic drawing of a submersible landfill pump attached to a sheathed tubing.
Figure 3:
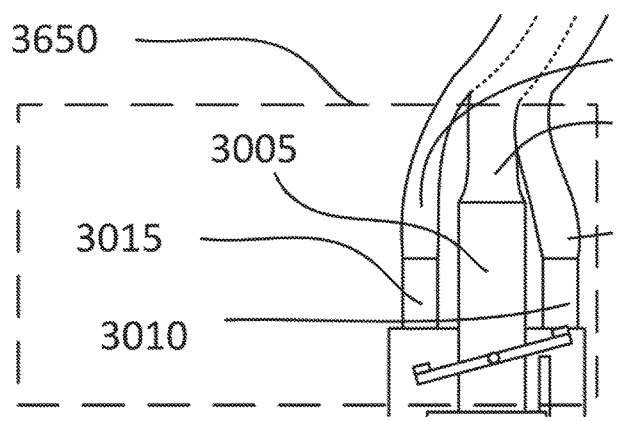
FIG. 3 is a schematic drawing of an expanded view of a portion of the submersible landfill pump of FIG. 2.

FIGS. 2 and 3 are schematic drawings of a submersible landfill pump attached to a sheathed tubing that provide inputs and outputs to the submersible pump. During operation, submersible landfill pump systems can discharge liquid from the pump through a fluid discharge tube 3710 to the surface of the landfill. Submersible landfill pump systems also receive air from above the landfill surface to its interior. A tubing that includes a plurality of separate tubes can be used to discharge water while introducing air to the pump at the same time. The tubing can bundle a plurality of tubes through a sheath or a casing. The plurality of tubes, when they are bundled together, have less likelihood of getting tangled with one another, and can be stronger so as to make the tubing suitable for extended use. A sheathed tubing 3700 can include one or more tubes connected to a submersible landfill pump. In one embodiment, the sheathed tubing 3700 includes an air discharge tube 3730, an air intake tube 3720, and a fluid discharge tube 3710. The sheathed tubing 3700 can be connected to a top plug assembly 3650 of the submersible landfill pump, which is shown in an expanded view in FIG. 3. The top plug assembly 3650 may include an air intake port 3010, an air discharge port 3015, and a discharge top assembly 3005.

In one embodiment, as illustrated in FIG. 3, the sheathed tubing 3700 includes the air discharge tube 3730, the air intake tube 3720, and the fluid discharge tube 3710 sheathed along its length, except near the end of the tubing. At the end of the tubing, the tubes spread apart from one another and connect to corresponding ports on the top plug assembly 3650 of the submersible landfill pump. In one embodiment, the air discharge tube 3730 is in fluid communication with the first air port 3010, the air intake tube 3720 is in fluid communication with the second air port 3015, and the fluid discharge tube 3710 is in fluid communication with the discharge top assembly 3005.

In some embodiments, the air discharge tube 3730, the air intake tube 3720, and the fluid discharge tube 3710 are sheathed together so that the space between each tube can be minimal. The minimal space between the tubes can help prevent introduction of foreign substance, such as moisture, mildew, mold, and other chemical or bacterial contaminants that can negatively affect the longevity and operation of the sheathed tubing 3700 and/or the submersible landfill pump system. Each tube may operate independently from one another, such that operation one tube does not interfere with another's. For example, the air discharge tube 3730 can be used for air flow in one direction while the air intake tube 3720 is being used for air flow in the opposite direction. Similarly, the fluid discharge tube 3710 can be used to transport water, while only air is being transported in the air discharge tube 3730 and the air intake tube 3720.

Figure 9:
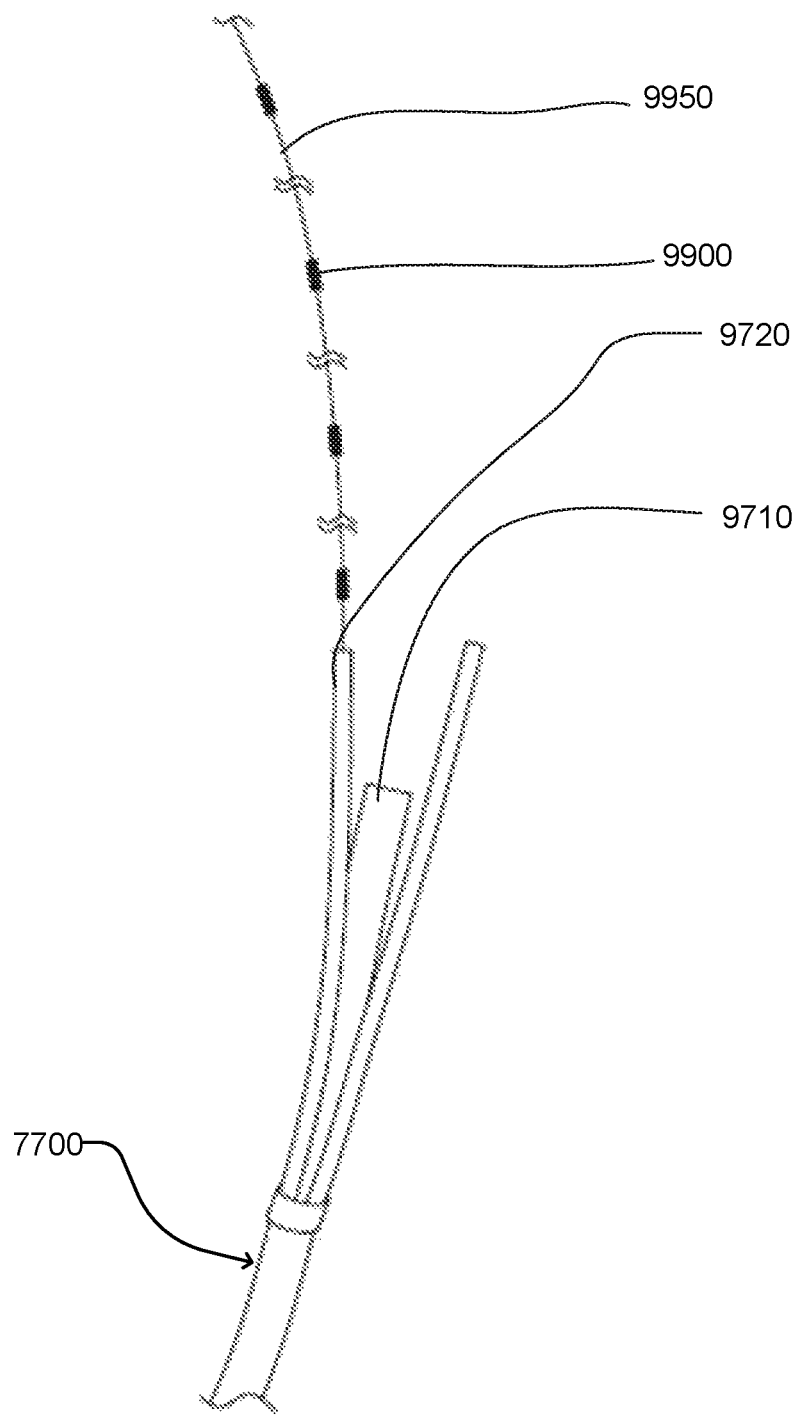
FIG. 9 is a schematic drawing of a sheathed tubing with a wire having sensors going through an air tube.

Submersible landfill pump systems may be subject to vibrations or impact. For example, during the operation of the submersible land fill pump system, pumping of water from the pump through the fluid discharge tube 3710 and constant closing and opening of the valve can shake or swing the pump. The pump can also receive external impact from seismic activities or shifting of landfill mass. Such stresses can fracture pump components and the sheathed tubing 3700. Stresses may also cause the tubing to become disconnected from the pump. The sheathed tubing 3700 with a plurality of tubes can be stronger than an individual tube. In one embodiment, as shown in FIG. 9, the sheathed tubing 3700 can comprise a plurality of tubes having similarly-shaped cross-sections. The tubes having similar shapes can be less prone to bending, being tangled up, and other stresses. As such, sheathed tubing 3700 can be suitable for use with the submersible landfill pump for an extended period.

Landfill wells can sometimes be filled with moisture, liquid, bacteria, and other types of harmful chemical pollutants that can corrode or otherwise compromise the integrity of tubes. The sheathed tubing 3700 can be made of any suitable material for operation in landfill well conditions. A suitable material for the sheathed tubing 3700 can resist puncturing, bursting, excessive bending, leaking, and/or corrosion. Such materials may include, for example, metals, such as aluminum, flexible steel alloy, stainless steel, etc.; polymer, such as PVC, polyethylene, polyurethane, rubber, neoprene, etc.; fabric, which can be combinations of metals, polymers, and other fabric materials. In some embodiments, the sheath and the tubes are made of the same material. In some embodiments, the sheath and the tube are made of different materials.

In some embodiments, each individual tube includes one or more smaller tubes. For example, a tube within the sheathed tubing 3700 can include smaller-diameter tubes. Such smaller-diameter tubes can be used to house electrical components connected via a wire described below in reference to FIGS. 8 and 9. The tubes can have a circular cross-section, or any other shape that is suitable for transporting fluid. For example, the sheathed tubing 3700 can include a plurality of tubes having rectangular, triangular, or T-shaped cross sections. Such configurations can be used, for example, in order to minimize the space between each individual tube. In some embodiments, the sheathed tubing 3700 can be an individual tube having partitions. For example, a tube having a cross-shaped partition can provide four independent fluid chambers, and each chamber can connect to individual pump components.

Pump with Pressure Sensor Actuation

Figure 4:
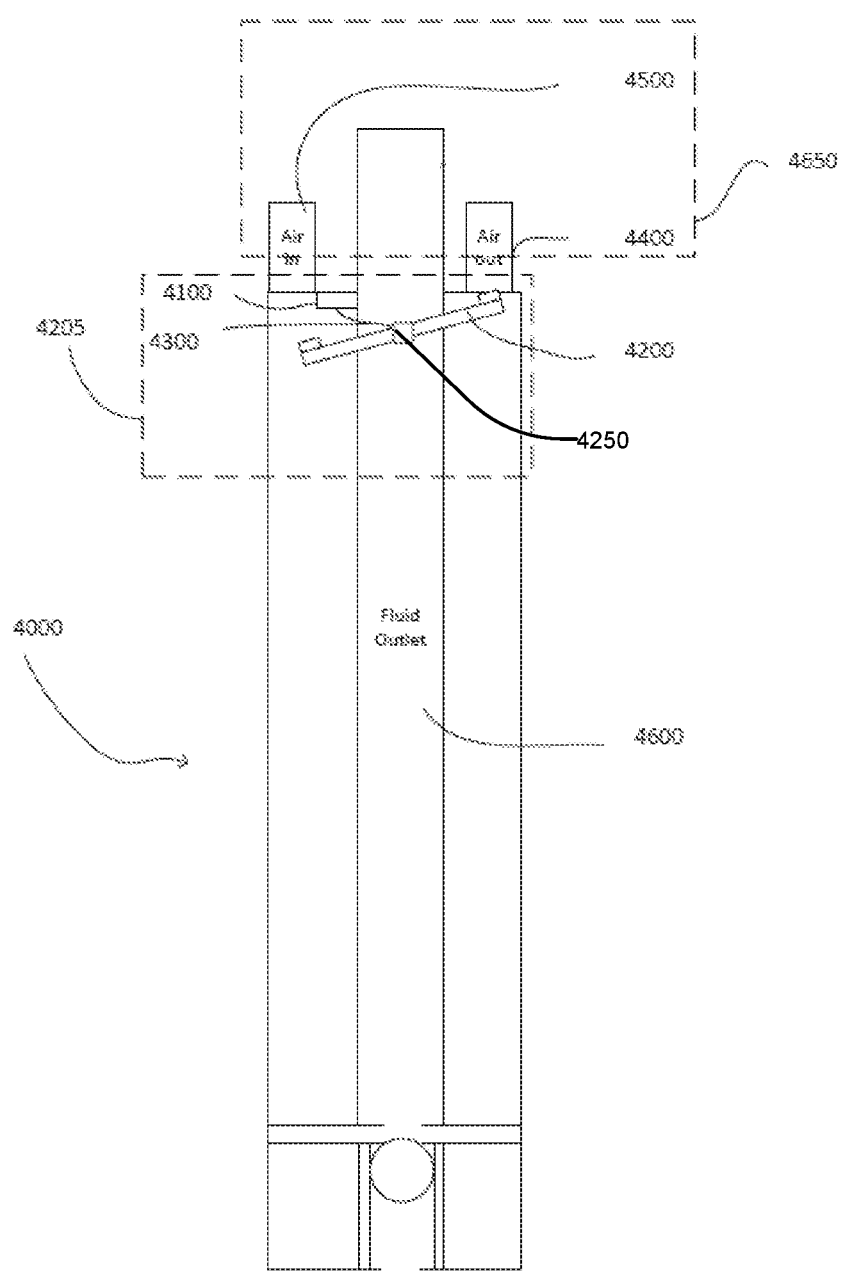
FIG. 4 is a schematic drawing of a submersible landfill pump with pressure sensor actuation.

FIG. 4 is a schematic drawing of a submersible landfill pump with pressure sensor actuation. As noted above, a pump having a larger size and/or more components can be costly, and expose the pump to more external stress, which can reduce the usage lifespan of a pump. As such, a pressure sensor actuation mechanism can be used to replace some of the submersible pump components, such as the float. Thus, by replacing the float, a pump using a pressure sensor actuation can be smaller in size, have a longer lifespan, and have reduced costs in manufacturing and installing the pumps. As shown in FIG. 4, a submersible landfill pump system can include a pressure sensor actuation mechanism 4205, a top plug assembly 4650, and a rocker assembly 4200. The pressure sensor actuation mechanism 4205 can include a pressure sensor 4100, a valve controller 4250, and a circuit connection 4300. The top plug assembly 4650 can include an air in port 4500, an air out port 4400, and a discharge pipe 4600. In some embodiments, as illustrated here in FIG. 4, a pump having the pressure sensor mechanism can be used without a float.

The pressure sensor can be an absolute pressure sensor, a gauge pressure sensor, a differential pressure sensor, or any other type of pressure sensor suitable for operation with the submersible landfill pump. One or more pressure sensors can be used. In some embodiments, the pressure sensor 4100 can be housed within a protective structure. Depending on the embodiment, the pressure sensor may be positioned within the pump to measure pressure as water rises within the pump and compresses air within the pump. The pressure sensor may be positioned outside the pump (e.g., on top of the pump, along the tubing leading to the pump, on a surface of the well, etc.) to measure pressure as water rises within the well and compresses air within the pump. Multiple pressure sensors may be positioned inside and outside of the pump to measure pressures within the pump and within the well.

The protective structure can be any type of structure that can protect the pressure sensor 4100. For example, the protective structure can be a sleeve, a box-like structure, or a recess within the interior of the submersible landfill pump 4000. The protective structure is configured to allow the pressure sensor 4100 to connect with other components of the pump. For example, the protective structure can have an outlet that allows the circuit connection 4300 to connect with the valve controller 4250. In some embodiments, the pressure sensor 4100 is located on or near the top of the submersible landfill pump 4000. For example, as shown in FIG. 4, the pressure sensor 4100 can be located immediately below the top plug assembly 4650. Placing the pressure sensor 4100 on or near the top of the submersible landfill pump 4000 may help ensure that the pressure sensor 4100 is not submerged or otherwise exposed to the liquid that fills the bottom of the pump.

Figure 6:
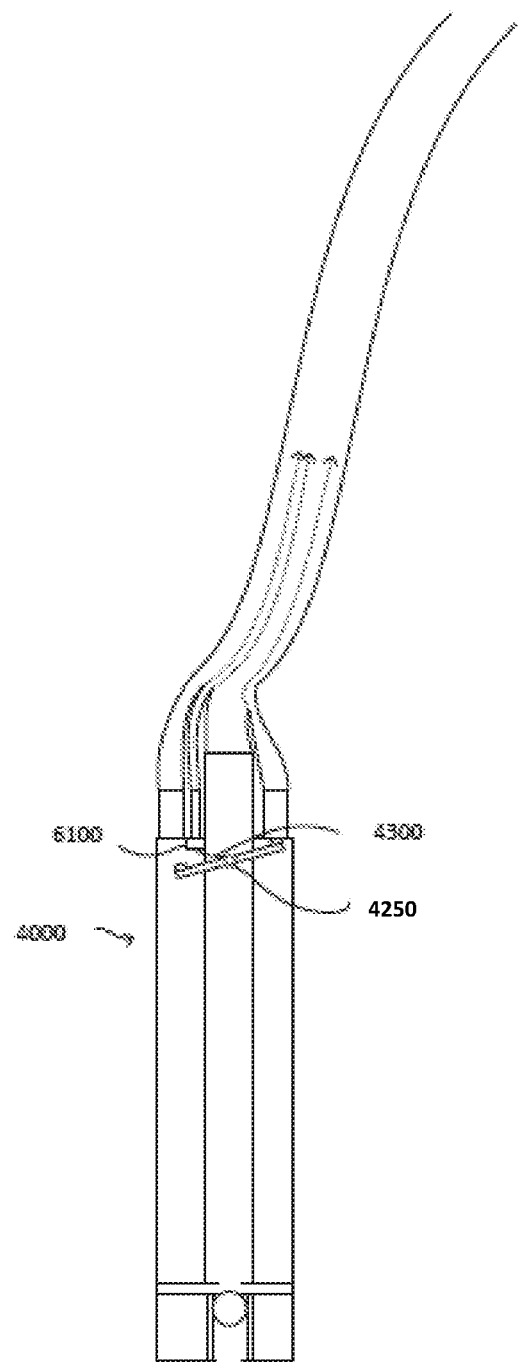
FIG. 6 is a schematic drawing of a submersible landfill pump having a data storage/processor that obtains sensor data and provides the data through a wire.

FIG. 6 is a schematic drawing of a submersible landfill pump having a data storage/processor that obtains sensor data and provides the data through one or more electrical wires. In some embodiments, the pressure sensor actuation mechanism 4205 further comprises a hardware computer processor 6100 (such as an FPGA, ASIC, microcontroller, or combination of analog circuitry) that can provide input instructions to the valve controller 4250. The processor 6100 can be configured to receive pressure values from the pressure sensor 4100 and to adjust position of the valve accordingly. In some embodiments, the processor 6100 further comprises a data storage that can store pre-programmed instructions for execution by the processor in monitoring pressure within the pump and controlling the valve position. In some embodiments, the processor 6100 further comprises a data transmitter/receiver. The data transmitter/receiver can be configured to send or receive instructions to and from above the landfill surface via electrical wires, fiber optics connection, or wirelessly, for example.

The processor can be connected via the circuit connection 4300 to the valve controller 4250. In some embodiments, the circuit connection 4300 is completely encased within the structure of the submersible landfill pump 4000. For example, the circuit connection 4300 can be housed within a recess in the pump casing. The circuit connection 4300 can be housed in a sleeve, such that no electrical component becomes exposed to liquid or moisture in the atmosphere. The sleeve can be made of water-proof and non-conductive material. For example, a sleeve made of silicone can be used.

In some embodiments, the pressure sensor actuation mechanism 4205 can operate in a variable power mode. For example, the air compressor(s) that provides pressure to the air in 4500 can be a variable pressure compressor that adjusts pressure supplied to the pump based on the current needs, such as based on a pressure reading from inside the pump. For example, if the pump is beginning to fill with fluid (as may be evidenced by an increase in pressure within the pump measured by the pressure sensor 4100, for example), the pressure provided to the air intake 4500 may be initiated and or slightly increased (e.g., to a low air pressure corresponding to a low power mode). Such a low power mode may require less electricity or gas to run the air compressor and/or may conserve compressed air resources from the air compressor to other pumps within the system, and/or for other purposes. In this embodiment, the air pressure provided to the air intake 4500 may be increased in response to the fluid level within the pump reaching a certain threshold level and/or increasing at a predefined rate (again, as may be measured by the pressure sensor 4100 and/or other sensors within the pump). Thus, in one embodiment the pump may operate in a variable power mode, wherein output from the pressure sensor and/or other sensors indicating fluid levels within the pump may be used to determine a power level of air pressure to provide to the pump, e.g., a low air pressure, medium air pressure, high prepare pressure, and/or a variable air pressure level that has multiple levels and can be adjusted in real-time based on fluid level, direction of movement of fluid, speed of direction of fluid, and/or other factors.

In some embodiments, the pressure sensor 4100 can be used to control and adjust the degree of opening and or closing of the air in port 4500, the air out port 4400, and the discharge pipe 4600, so that the submersible landfill pump system 4000 can operate efficiently. In some embodiments, the pressure sensor actuation mechanism 4205 can adjust the rocker assembly 4200 to partially open or close the air in port 4500 and the air out port 4400. In such partially closed or partially opened positions, the rocker assembly 4200 may not fully close or fully open the air in port 4500 and the air out port 4400. Different types of valves can be used. For example, in some embodiments, the submersible landfill pump system includes one or more valves. The pressure sensor actuation mechanism 4205 can be connected to one or more valves (not shown) to adjust the flow rate of liquid flowing through the top plug assembly 4650.

In some embodiments, the pressure sensor actuation mechanism 4205 can be comprised of components that are visibly separate from one another. In some embodiments, the pressure sensor 4100, the electrical circuitry, and the valve controller 4250 can all comprise one visibly singular component. In some embodiments, the components of the pressure sensor actuation mechanism 4205 are physically adjacent to one another.

The pressure sensor actuation mechanism 4205 can be powered by an internal power source. For example, a battery can comprise a part of the pressure sensor 4100. The battery can provide power to the pressure sensor 4100 and the valve controller 4250 that is connected to the pressure sensor 4100 via the circuit connection 4300. In some embodiments, the pressure sensor actuation mechanism 4205 can be a separate power source within the submersible landfill pump 4000. For example, an internal battery can be located within the interior of the submersible landfill pump 4000. In some embodiments, the pressure sensor actuation mechanism 4205 is powered by an external power source, located outside of the submersible landfill pump 4000. For example, the pressure sensor actuation mechanism 4205 can be connected to an external battery through a wire. The external power source can be located above the surface of the landfill outside of the well, or within the well. In such embodiments, the battery can be connected to the pressure sensor actuation mechanism via a conduit, such as a conduit on the top of the submersible landfill pump as described below in reference to FIG. 5.

The valve controller 4250 can be configured to repeatedly open and close the rocker assembly 4200 responsive to pressure levels within the pump. In some embodiments, the valve controller 4250 can be comprised of mechanical parts and electronic parts. The mechanical parts of the valve controller 4250 can be configured to withstand the repeated opening and closing motion of the rocker assembly 4200 for an extended period. The mechanical structure of the valve controller 4200 can be configured to allow efficient opening and closing of the rocker assembly 4200. For example, the valve controller 4250 can include a damper actuation mechanism.

The pressure sensor 4100 can detect increases in pressure level inside the pump. For example, the pressure inside the pump can increase due to rising water level inside the pump. The valve controller 4250 can detect this increase in pressure based on readings from the pressure sensor 4100 and, in turn, actuate the valve. In some embodiments, the valve controller 4250 receives instruction from a processor to actuate the rocker assembly 4200. The pressure sensor 4100 mechanism can be configured so that the rocker assembly 4200 can open or close air in port 4500 and air out port 4400 at preset pressure levels inside the pump.

In some embodiments, the processor can be located in other areas within the submersible pump. For example, the pressure sensor 4100 can be located above the top plug assembly 4650 and connected to the interior of the pump via a conduit. Such configuration can be used, for example, to detect the pressure differential between the interior of the pump and the outside of the pump. In some embodiments, the pressure sensor actuation mechanism 4205 can be used in combination with a float actuation mechanism. In some embodiments, the pressure sensor actuation mechanism 4205 can be used with a submersible landfill pump 4000 having significantly different structure compared to conventional submersible landfill pumps. For example, the pressure sensor actuation mechanism 4205 can be used with a pump that does not have any air in port or air out port, or with only air in port, or with only air out port. In such embodiments, the pressure sensor data can be sent to an apparatus outside of the well, which in turn uses the sensor data to control the rate of pumping from within the well. In some embodiments, the pressure sensor actuation mechanism 4205 can be used with other electrical components. For example, the pressure sensor actuation mechanism 4205 can include a temperature sensor, the data obtained from the temperature sensor and the pressure sensor actuation mechanism 4205 can be used to accurately control the rate of pumping from within the well.

Pump with Conduit for Electrical Wiring

Figure 5:
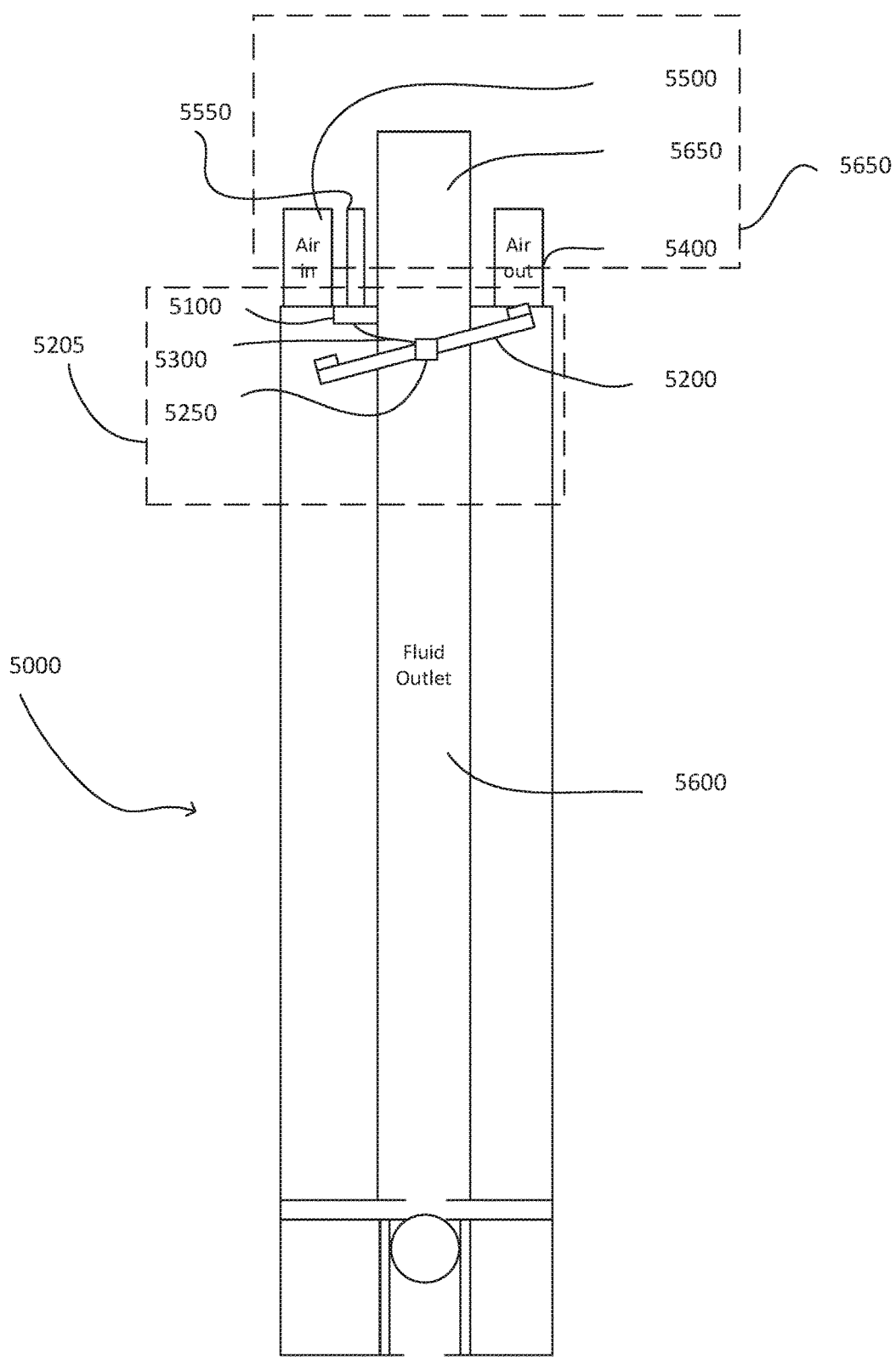
FIG. 5 is a schematic drawing of a submersible landfill pump with conduit for electrical wiring to a pressure sensor

FIG. 5 is a schematic drawing of a submersible landfill pump with conduit for electrical wiring to a pressure sensor. The wiring can be used, for example, in order to power the operation of the pressure sensor actuation mechanism and/or to transmit data obtained from the pressure sensor actuation mechanism to outside of the well. A submersible landfill pump system 5000 can include a pressure sensor actuation mechanism 5205, a top plug assembly 5650, and a rocker assembly 5200. The pressure sensor actuation mechanism 5205 can include a pressure sensor 5100, a valve controller 5250, and a circuit connection 5300. The top plug assembly 5650 can include an air in port 5500, an air out port 5400, an electronics conduit 5550, and a discharge pipe 5600.

The pressure sensor actuation mechanism 5205 can be located on or near the top plug assembly 5650 of the submersible landfill pump system 5000. In some embodiments, the electronics conduit 5550 is located inside one of the air ports 5500, 5400. For example, the electronics conduit 5550 can be located in the air in port 5500 as illustrated in FIG. 5. The electronics conduit 5550 can be sized and shaped to fit wires and/or data cables. The wires and/or data cables can be used to power the pressure sensor actuation mechanism 5205, and/or to transmit data to and from the pressure sensor actuation mechanism 5205 to the outside of the submersible landfill pump.

In some embodiments, the air in port 5500 can be used as the electronics conduit 5550 and does not require a separate structure to introduce wires/data cables. In some embodiments, the electronics conduit 5550 can be an independent conduit on the top plug, not shown. For example, the top plug can include an electronics conduit 5550 port which is independent from the air in port 5500, the air out port 5400, and the fluid discharge pipe 5600. In such embodiments, the submersible landfill pump 5000 system can use four or more tubes. The fourth tube, which is in addition to three tubes configuration in FIGS. 3 and 9, can be used so that the fourth tube and the electronics conduit 5550 are in fluid communication.

Submersible Landfill Pump Connected to Port/Wireless Transmitter

Figure 7:
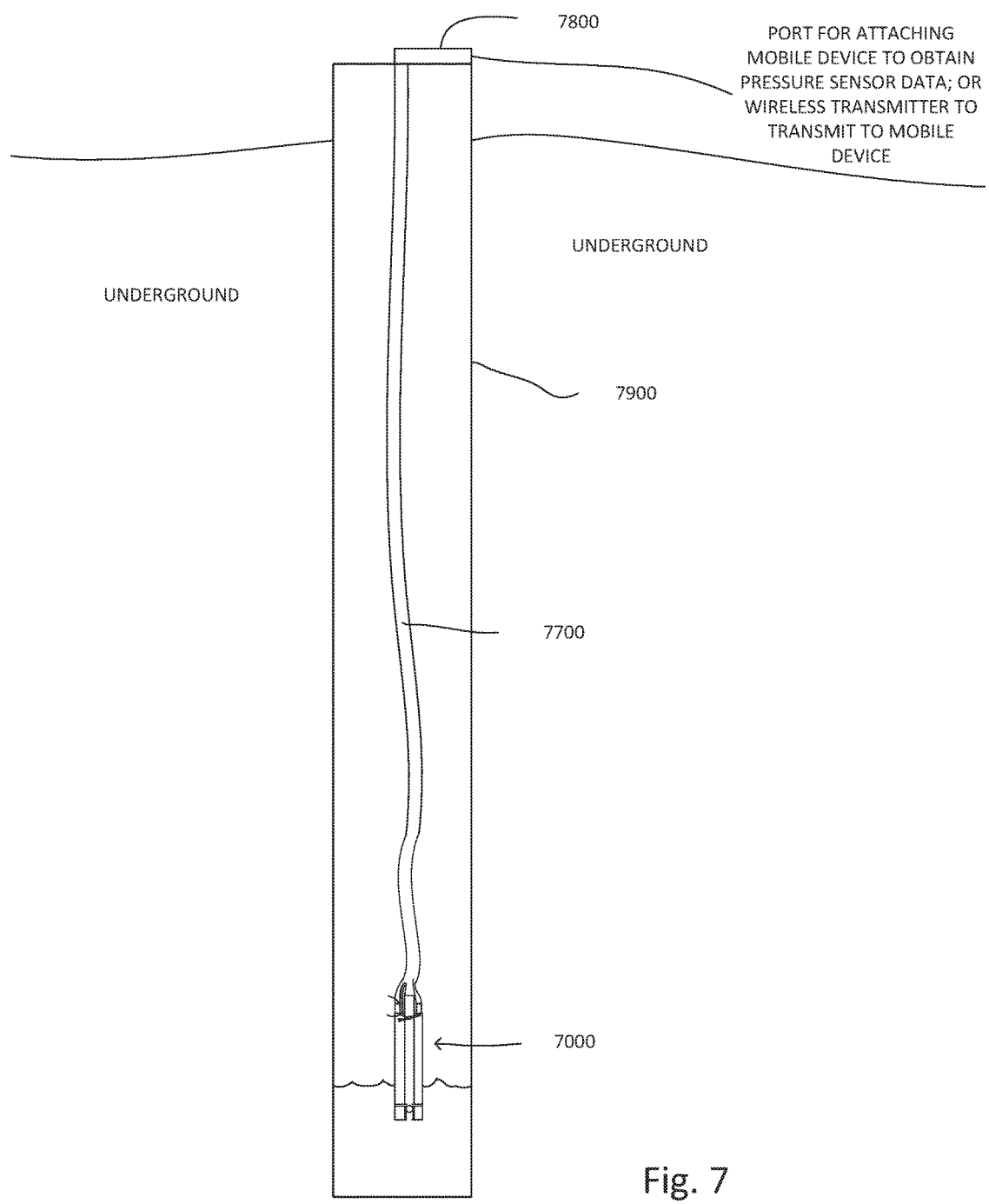
FIG. 7 illustrates a submersible landfill pump submerged in a well and connected to a port/wireless transmitter.

One of the challenges in operating a submersible landfill pump is the difficulty in determining underground conditions, such as the level of bioactivity or the amount of pressure within the well. FIG. 7 illustrates a submersible landfill pump submerged in a well and connected to a port. A submersible landfill pump system can include a pump 7000, a sheathed tubing 7700, a well 7900, and a port 7800 for transferring data to mobile device.

The port 7800 can be located outside of the well 7900. For example, the port 7800 can be on or near the top of the well 7900. In some embodiments, the port 7800 can be on the well head. The port 7800 can be connected to the pump via wires/data cables 9950 housed within a tube as shown in FIG. 9. The pressure/temperature sensor data obtained from within the pump can be sent to the port 7800 via the wires/data cables 9950 shown in FIG. 9. In some embodiments, the transmission of data from the pressure/temperature sensor is done wirelessly. In some embodiments, the pressure/temperature data can be periodically stored in the port 7800. For example, the temperature/pressure data can be stored hourly, every 12 hours, or daily. By periodically storing conditions within the well, a technician can monitor changes inside the well 7900. In some embodiments, the port 7800 can comprise a display, with or without a storage device in some embodiments. For example, in one embodiment the port 7800 may include a display that shows current sensor data, such as individual sensor values and/or some derived sensor data based on sensor values from multiple sensors, without a local storage device that stores the sensor data. The port 7800 may transmit the sensor data to a remote device such as via cellular data, Bluetooth, wireless Internet, or any other communication medium, such that the remote device can store and further analyze the sensor data. Thus, the port can include different combinations of components, such as a storage device, display, processing device, etc.

In some embodiments, the port 7800 can generate and display a holistic data based on different variables. For example, the port 7800 can receive and/or store seismic data, pressure data, and/or temperature data. The port 7800 can be configured to analyze such variables and generate a holistic data analysis that can help determine conditions within the well 7900. The holistic data analysis can include, for example, profiling and/or mapping of various sensor data along a length of a well. Pressure sensor data taken in various different lengths of the well can be used to generate, for example, a pressure distribution map. The pressure sensor distribution map can be displayed on the port 7800, or a display located off-site. Graphics and numerical data displayed on a display of the port 7800, a mobile device in communication with the port 7800, such as a smartphone, tablet, or device specifically designed to communicate with landfill wellheads to obtain data regarding the well (e.g., LANDTEC'S GEM products), or other off-site display that can make it easy to interpret and provide the user or the technician with relevant data for operating the well. The temperature sensors placed in various lengths of the well can be used to generate a temperature distribution map. The data generated by temperature sensors can also be used with the data generated by pressure sensors to more accurately determine pressure in different lengths of the well. Similarly, pressure sensor data can be used with temperature sensor data to more accurately determine temperature in different lengths of the well, for example, to determine bioactivity within a length of the landfill. In some embodiments, various different kinds of geophysical analysis tools can be used to map the underground conditions of the landfill. Geophysical analysis tools can be used with pressure and/or temperature sensor data to more accurately determine the pressure, temperature, and other conditions within the well. Geophysical analysis tools can include, but are not limited to, seismic refraction, ground penetrating radar (GPR), magnetics, electromagnetics, resistivity, borehole logging, gravity surveys, induced polarization, etc.

In some embodiments, a temperature mapping of a well (such as discussed above) can be used to determine how productive a well is at the current extraction depth. The normal operating temperature within a well at a highly productive depth of the well (areas with large concentrations of landfill gas) may be in the range of 100-125 degrees Fahrenheit, while the temperature of areas above and/or below such highly productive depths may be much lower, such as 50%-90% lower. Thus, by monitoring the temperature at the current extraction depth and comparing to temperatures at other well depths (e.g., every 10 or 20 feet of a 100 foot well), the technician (or offsite analyst that reviews the data) can determine whether the well is at its optimum production or, in contrast, if the extraction depth should be moved up (or down) to a depth with a higher temperature (and likely a higher landfill gas concentration). Thus, in one embodiment the port 7800 and/or other components on-site of the well and/or offsite, such as a network server that stores data from multiple wellheads, accesses the wellhead temperature mapping and automatically determines an optimum depth for landfill gas extraction, which may be automatically implemented at the wellheads (e.g., the wellheads may have electronically adjustable valves, and/or manually by a technician).

In one embodiment, the port 7800, circuitry within the pump itself, and/or other circuitry remote from the well, may store historical sensor data, such as temperature and pressure data. This data may then be processed, e.g., by a network server, to determine trends over time in such sensor data. Thus, a gradual decrease in temperature at a first well depth over a period of months may be identified, while a gradual increase in temperature at a second well depth over the same period may also be identified. This historical data may also be used to predict future properties of the well at these various depths such that changes to the well settings (such as pump depth, flow valve positions, etc.) may be anticipated and made in a timely manner, whether by a technician manually or automatically by sending electronic instructions to the well from a central server for electronic implementation of the changes.

Similar to the example discussed above with reference to temperature mapping, software may be configured to analyze other sensor data, such as temperature and pressure data from multiple sensors with a well (or multiple wells at a particular landfill, for example) in order to determine more informative profiles of the wells or combination of wells (e.g., at a landfill) and/or provide well adjustment indications that better optimize production of the well (or entire landfill) than may be possible using only temperature data alone.

In some embodiments, the port 7800 comprises manual inputs. For example, a technician can adjust pump components, such as the pressure sensor actuation mechanism described above in reference to FIGS. 4 to 6. The port 7800 can be configured to collect data selectively, such as collecting only temperature data, or only seismic data.

In some embodiments, the technician may use a mobile device (not shown) to connect with the port 7800, such as LANDTEC'S GEM products. The data stored in the port 7800 can be transmitted to the mobile device. The mobile device can be used to receive and analyze data from the port 7800. In some embodiments, the mobile device can be used to transmit data from the mobile device to an off-site location. For example, a mobile device can be used to transmit data from the port 7800 to an external database. The technician may use the mobile device to communicate with an off-site engineer who will then be able to provide direct input or instruct the technician to place input to the port 7800. The input and the output steps can be done from the port 7800 to the mobile device, or from the mobile device to the port 7800. For example, the port 7800 can provide input to the mobile device by transmitting data from the mobile device to an off-site data collection server, or to another mobile device. The input and output can also be done in the form as a 'handshake signal,' that allows the port 7800 to recognize the mobile device.

In some embodiments, the port 7800 wirelessly transmits data to and from an off-site data collection database. For example, the port 7800 can be configured to transmit data at preset intervals of minutes, hours, days, or any other duration that is suitable for operating a submersible landfill pump 7000. The port 7800 can also receive instruction from or give instruction to the external database.

Submersible Landfill Pump with Temperature Sensors and/or Pressure Sensors

Figure 8:
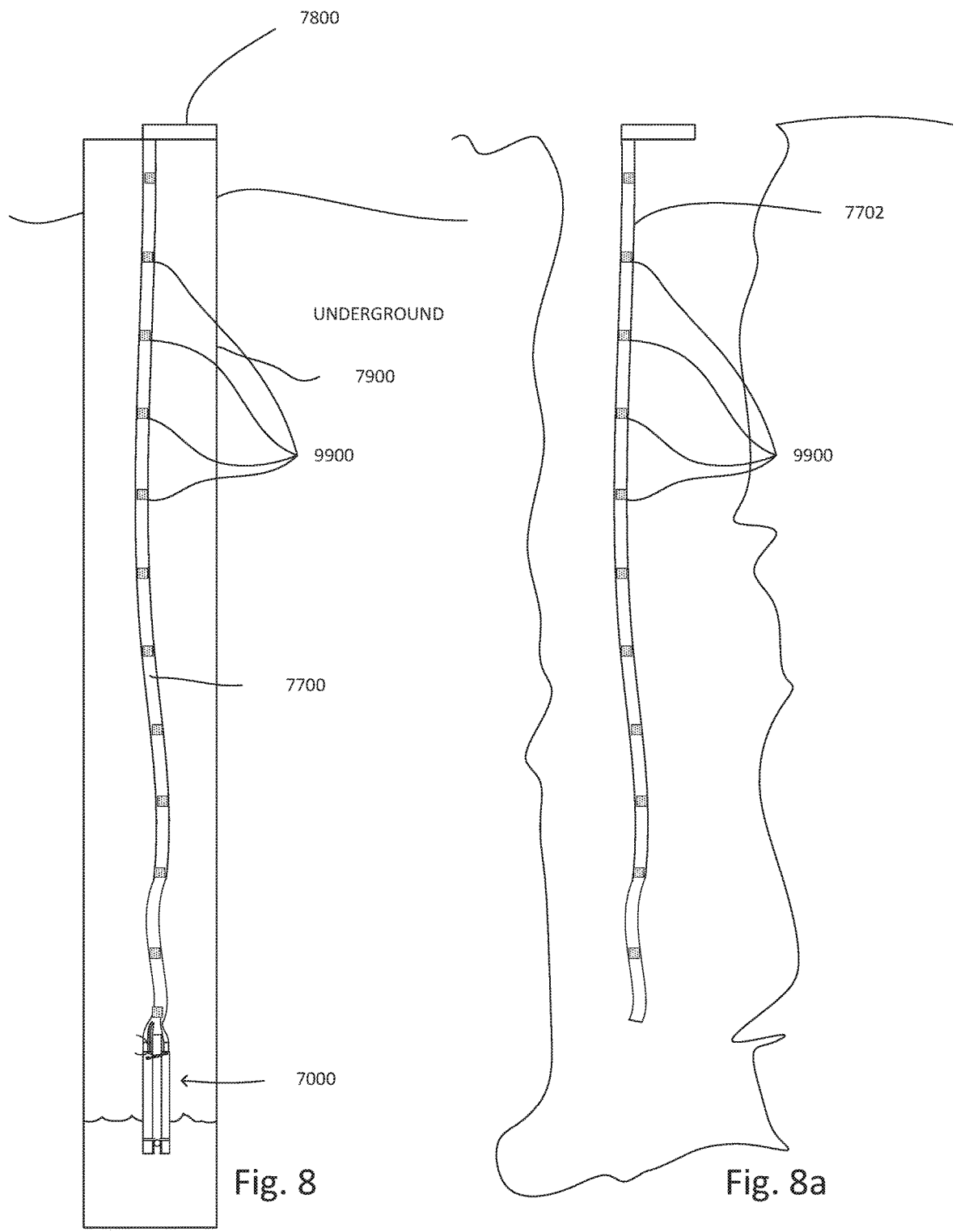
FIG. 8 illustrates a submersible landfill pump submerged in a well and having sensors placed along sheathed tubing.

As noted above, a more efficient operation of the submersible landfill pump may be achieved by determining the level of bioactivity inside the well. As such, temperature sensors can be used to determine whether there is a sufficient amount of bioactivity at a certain depth level within the well. FIG. 8 illustrates a submersible landfill pump submerged in a well and having sensors placed along sheathed tubing. A submersible landfill pump system can include a pump 7000, a sleeved tubing 7700, a port 7800, and a plurality of temperature and/or pressure sensors 9900. FIG. 9 is a schematic drawing of a sheathed tubing 7700 with a wire having sensors going through an air tube. A sheathed tubing 7700 with a wire having sensors can include one or more air tube 9720 and a discharge tube 9710. The one or more air tube 9720 can house a wire 9950 having a plurality of sensors 9900.

In one embodiment, the plurality of temperature/pressure sensors are placed in various different intervals along the length of the sheathed tubing 7700 or another substrate in order to form a sensor array. Such a sensor array may be use with or without a pump attached to a lower end of the sensor array. For example, a sensor array including a plurality of temperature and/or pressure sensors 9950 may be lowered into a well (or any other opening or space, such as a well, cliff, cave, mine, etc.) in order to obtain temperature and/or pressure data along a length of the well (or other opening or space). Thus, any description herein of sensors in use with a submersible landfill pump should be interpreted to also specifically cover embodiments not including a submersible landfill pump. In some embodiments, such a sensor array may be attached to any other substrate and the sensor may be exposed directly to the fluid (e.g., air or water) in which they are placed or may be shielded from the fluid by the substrate (such as the sheathed tubing discussed in several examples herein). For example, FIG. 8a illustrate an example sensor array 7702 that includes a plurality of sensors 9900 (e.g., temperature, pressure, humidity, etc.), wherein the array 7702 is not attached to a pump and is lowered into a cavity. Any discussion herein of sensors used in conjunctions with a submersible landfill pump should be construed to include the same and similar used with reference to the example sensor array 7702 of FIG. 8a.

In example embodiments, temperature sensors can be placed in 5 feet intervals, 10 feet intervals, or any other interval suitable for detecting conditions of the well, such as to be used in adjusting operating characteristics of the submersible landfill pump 7000. Any number of temperature sensors can be used as necessary. In some embodiments, the temperature sensors 9900 are placed at around 25 feet intervals, which would require about two or more temperature sensors when used with a submersible landfill pump 7000 located about 75 feet below ground (or in another area of interest where a pump is not used). Different kinds of sensors can be used. The sensors can include temperature sensors, as well as pressure sensors described above in reference to FIGS. 4 to 6. For example, geophones can be used to collect seismic data of the landfill. The pressure sensors can be placed at the same location as the temperature sensors, or be placed at different intervals, or in different numbers as the temperature sensors along the length of the sheathed tubing 7700 or other substrate. In some embodiments, the pressure sensors can be located within the sheathed tubing 7700, while the temperature sensors are located outside of the sheathed tubing 7700. The temperature/pressure sensors 9900 can be powered by an external battery source, such as a power source located above the landfill surface. The pressure/temperature sensors 9900 can be connected via a power cable and/or data transmission cable, so that the sensors can operate and transmit relevant data.

Each temperature sensor can be used to measure the temperature at a certain depth level. A technician can use temperature information to determine whether there is sufficient bioactivity within the well 7900. For example, if the temperature at a certain depth within the well is around 75° F., it may indicate that a sufficient bioactivity exists at that level. This information can be used to adjust the location of the submersible landfill pump 7000. For example, if sufficient bioactivity is found to exist at 50 feet beneath the landfill surface, and the pump is located around 75 feet beneath the surface where there is little to no bioactivity, the pump can be pulled 25 feet above its original location. Pressure, temperature, and seismic data can be used to determine whether there's any defects in the well 7900. Such data can be used to determine the conditions within the pump, and may also be used to adjust the operating conditions of the pump to ensure efficient operation of the pump.

In some embodiments, the distance between the sensors is not fixed and can be adjusted. For example, a technician may be able to adjust location of temperature sensors that were originally 10 feet apart, to being 5 feet apart. In some embodiments, the sensors can be located below the submersible landfill pump 7000. In some embodiments, the wire having temperature sensors can be placed outside of the sheathed tubing 7700. For example, as shown in FIG. 9, a separate tube which houses a wire having a plurality of temperature/pressure sensors can be used. In some embodiments, a separate tube having temperature/pressure sensors can spiral around the sheathed tubing 7700. In some embodiments, the wire having a plurality of temperature/pressure sensors can be placed on the wall of the well 7900, away and independent from the tubes that are in fluid communication with the pump.

Other Embodiments

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A pneumatic, landfill pump system for use in a landfill well that extends below a surface, the landfill pump system comprising:
    a submersible pump disposed in the landfill well, and the pump having a pump casing;
    at least one connection extending from the submersible pump towards the surface of the landfill well, the at least one connection including an outer sheath for:
    enclosing an air flow line for supplying pressurized air to the submersible pump; and
       enclosing a fluid discharge line for channeling fluid being pumped by the submersible pump out from the landfill well;
    a sensor array comprising a plurality of sensors disposed adjacent the submersible pump and adjacent the outer sheath, and outside of the pump casing, and spaced apart to be at different depths within the landfill well, wherein the sensors are disposed along a length of the connection extending from the submersible pump towards the surface of the landfill well, and wherein the plurality of sensors is configured to measure conditions related to fluids present in the landfill well, at different depths in the landfill well, for use in helping to control operation of the pump;
    a processor in data communication with the sensors and configured to execute instructions in order to adjust one or more operating conditions of the pump based on sensor data from the plurality of sensors.

2. The pump system defined in claim 1 wherein the plurality of sensors forming the sensor array comprises a plurality of temperature sensors.

3. The pump system defined in claim 1 wherein the plurality of sensors forming the sensor array comprises a plurality of pressure sensors.

4. The pump system defined in claim 1 wherein the plurality of sensors forming the sensor array comprises a plurality of temperature sensors and a plurality of pressure sensors.

5. The pump system defined in claim 1 wherein the plurality of sensors forming the sensor array comprises a plurality of temperature sensors located outside of the sheathing.

6. The pump system defined in claim 1 wherein the plurality of sensors forming the sensor array comprises a plurality of pressure sensors located inside of the sheathing.

7. The pump system defined in claim 1, wherein at least one of the plurality of sensors comprises a geophone.

8. The pump system of claim 1, wherein at least one of the plurality of sensors comprises a humidity sensor.

9. The pump system of claim 1, wherein the at least one connection comprises a sheathed tubing, and wherein the sheathed tubing comprises the plurality of sensors, the plurality of sensors being spaced apart along a length of the tubing.

10. A pump system for use in a well that extends below a ground surface, the pump system comprising:
    a submersible pump disposed in the well;
    at least one connection extending from the submersible pump toward the surface;
    the at least one connection including an outer tubing extending from the submersible pump towards the surface and enclosing an air line and a fluid discharge line; and
    at least one tubing including a string of spaced apart sensors forming a sensor array enclosed within the outer tubing; and
    wherein the string spaced apart sensors is configured to measure conditions related to conditions present in the well, at different depths in the well, for use in helping to control operation of the pump.

11. The pump system of claim 10, wherein the sensors of the sensor array include a plurality of pressure sensors.

12. The pump system of claim 10, wherein the sensors of the sensor array include a plurality of temperature sensors.

13. The pump system of 10, wherein the string of spaced apart sensors of the sensor array include a geophone.

14. The pump system of claim 10, wherein the sensors of the sensor array include a combination of pressure and temperature sensors.

15. The pump system of claim 10, wherein the sensors of the sensor array include a humidity sensor.

16. The pump system of claim 10, wherein the at least one tubing comprises a sheathed tubing.

17. The pump system of claim 10, wherein the sensors are evenly spaced along a length of the outer tubing and interconnected by at least one wire.

18. A method for obtaining information relating to a fluid in a well extending below a ground surface, where the fluid is being pumped out from the well by a pump having a pump casing, the method comprising:
    using a first tubing extending from the ground surface to the pump to connect with the pump and to provide pressurized air to the pump through an air supply line, and also to enable discharge of pumped fluid from the pump through a fluid discharge tube separate from the air supply line;
    using a second tubing to contain a plurality of sensors, the plurality of sensors being spaced apart along a length of the second tubing and disposed in the well outside of the pump casing of the pump and adjacent the first tubing, with at least one of the sensors being disposed in the fluid in the well, and all of the sensors being in communication with a data collection device external to, or adjacent to, the well;

the sensors providing data relating to environmental conditions in the well, the sensors configured to measure conditions related to conditions present in the well, at different depths in the well, for use in helping to control operation of the pump.

19. The method of claim 18, wherein the sensors comprise at least one pressure sensor.

* * * * *